United States Patent Office 3,423,568
Patented Jan. 21, 1969

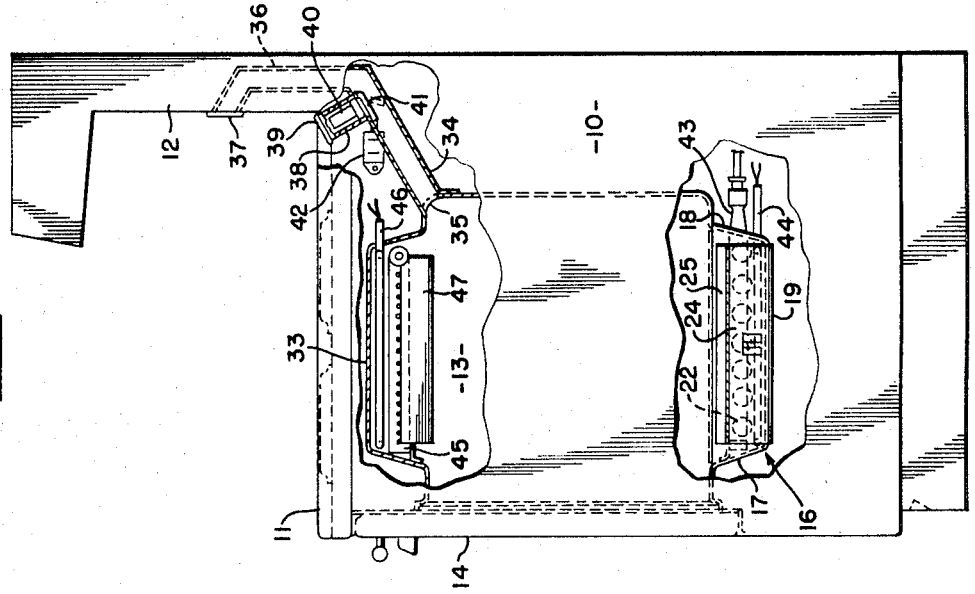
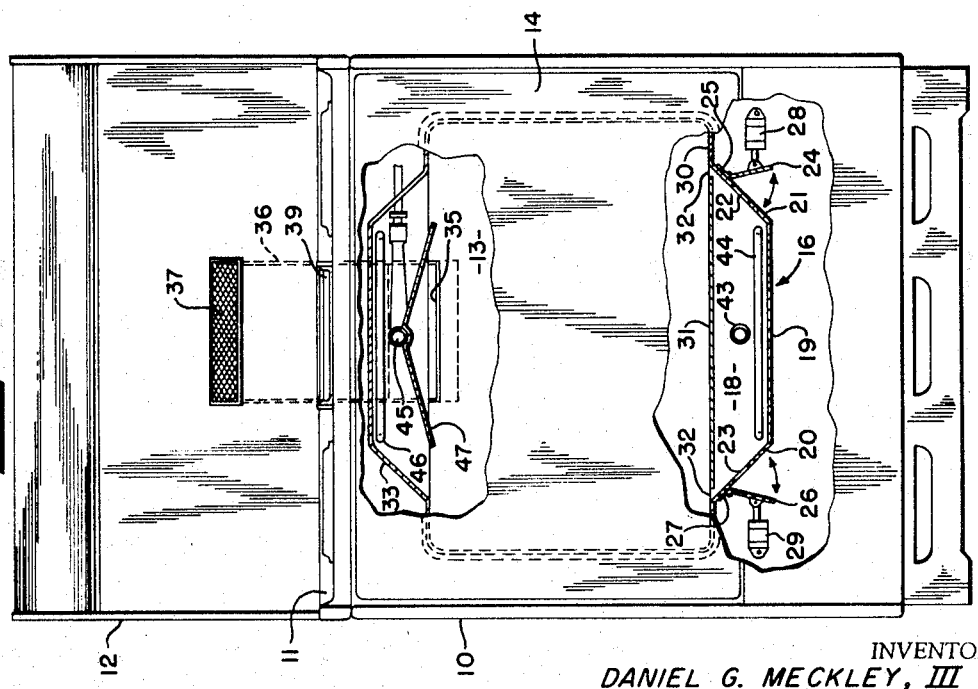

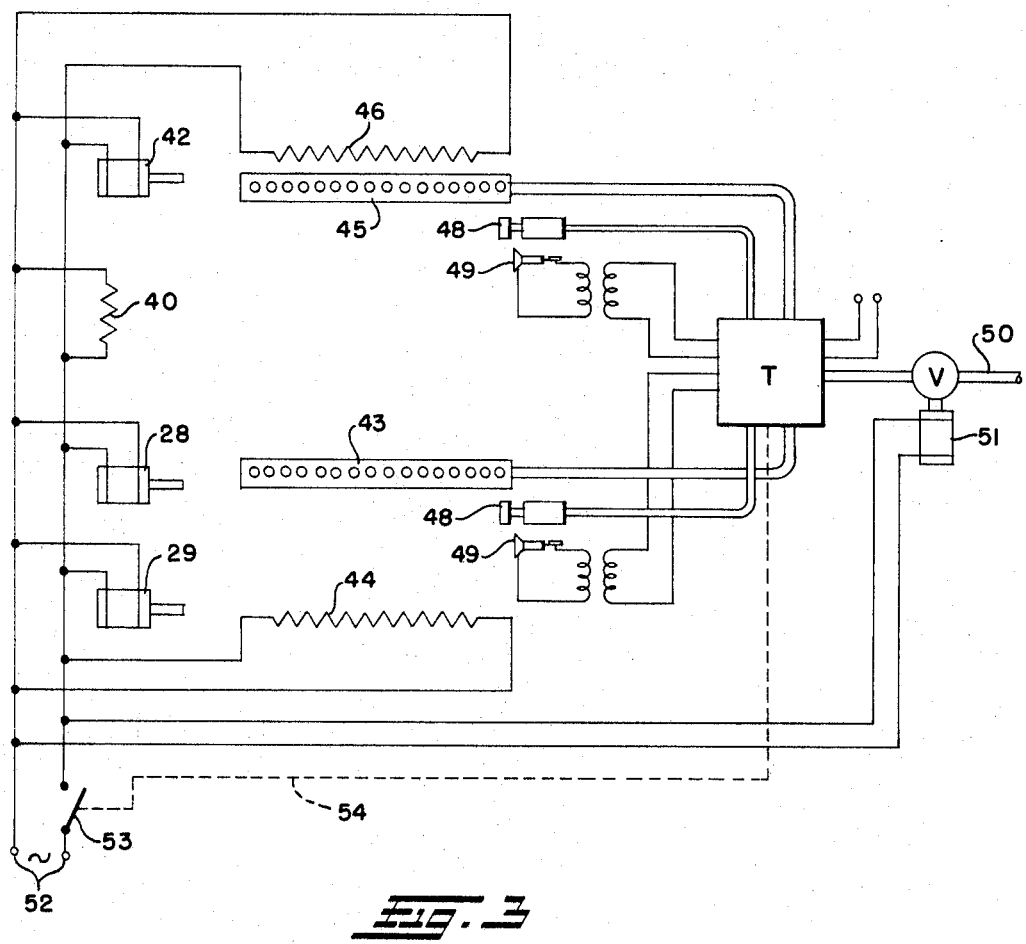

3,423,568
ELECTRIC AND GAS SELF-CLEANING OVEN
Daniel G. Meckley III, and Arthur W. Vonderhaar, Mansfield, Ohio, assignor to The Tappan Company, Mansfield, Ohio, a corporation of Ohio
Filed Aug. 22, 1966, Ser. No. 573,923
U.S. Cl. 219—279    13 Claims
Int. Cl. F27d 11/00

This invention relates to a cooking oven the operation of which includes a heat cleaning cycle for pyrolytic removal of food soils from the interior surfaces of the oven cavity.

It has been established that the food soils which accumulate on such oven surfaces as a result of ordinary cooking operations consist essentially of proteins, fatty compounds, and carbohydrates which decompose when heated to a temperature within the range of from about 750° F. to about 950° F. for a relatively short period of time. Such decomposition produces gaseous degradation products fundamentally by pyrolysis, without burning in the usual sense, and a certain amount of residue in the form of readily removable ash. The gaseous products are of course to be exhausted from the oven and preferably treated in a catalytic oxidizing unit before discharge to the atmosphere.

It is a primary object of the present invention to provide a gas cooking oven equipped and controlled for heat cleaning by the foregoing method.

Another object is to provide an oven in which normal cooking operations are accomplished by gas burner means, such operations being realized in the same manner as in a conventional gas oven, and an auxiliary electric heating system is operative to bring the temperature to the higher than normal value required for such self-cleaning action.

It is also an object to provide such a combination oven in which the normal configuration of the oven suited for the gas cooking operations is automatically altered upon the scheduling of a heat cleaning cycle for more efficient utilization of the electric heating system.

An additional object of the invention is the provision of a control circuit for such a combination oven in which energization of the auxiliary electric heating system causes automatic and full disabling of the gas burner means.

A further object is the provision of a method for the practice of pyrolytic cleaning in an oven in which the normal cooking operations are accomplished by combustion of gaseous fuel mixtures.

It is a still further object of the invention to provide a cooking oven in which gas burner means is utilized to heat the cavity to a predetermined temperature and, upon the occurrence of such temperature, the gas heating is completely terminated and an auxiliary electric heating system is effective to continue heating the cavity to a temperature within the cleaning range of from about 750° F. to about 950° F.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a front elevational view, partly broken away and partly in section, of a domestic range embodying a self-cleaning oven in accordance with the present invention;

FIG. 2 is a side elevational view, also partly broken away and partly in section, of the range of FIG. 1; and FIG. 3 is a diagrammatic illustration of the heating and control systems for said oven.

Referring now to the drawings in detail, the illustrated range is of free-standing type and comprises a cabinet 10, a surface cooking assembly 11 supported at the top of the cabinet, and a backsplasher assembly 12 projecting upwardly at the rear of the cooking top 11. The oven is within the cabinet and comprises a metal liner 13 of general box shape and having an open front in register with a corresponding opening in the front of the cabinet, with the latter mounting a bottom hinged oven door 14 for closing the oven cavity.

As previously noted, this oven is intended to operate for self-cleaning at a temperature within the range of from about 750° F. to about 950° F., and the mechanical design and the thermal insulation thereof will be such to permit this heating to be carried out in safe and completely acceptable manner. The oven liner will, for example, be surrounded with fibrous glass and the door will be suitably sealed against the loss of heat, it also being preferred that thermally interlocked latch mechanism be used with the door to preclude opening thereof when the temperature of the cavity is above a predetermined relatively high degree. These features are, however, known in automatic cleaning ovens of constructions other than that of the present invention, and such details are not needed for full and proper understanding of this invention, whereby they have not been illustrated and will not be further described.

The bottom wall of the new oven is of a special formation which provides a lower or bottom burner box, designated generally by reference numeral 16, below the plane of the bottom of the cooking cavity. More particularly, this lower box section comprises an imperforate front wall 17 having a rearward inclination, a forwardly inclined perforate rear wall 18, an imperforate substantially horizontal bottom wall 19, and inwardly inclined side walls 20 and 21. The side walls are provided with openings indicated at 22 and 23, respectively, and shown as a series of circular openings spaced along the length of each side wall. A solid baffle or shutter plate 24 is attached by a hinge 25 to the outside of the side wall 20, with the hinge being above the row of circular openings 22 therein and the shutter thus suspended at its top edge and of a height and length to completely cover the openings when swung inwardly to overlie the angular side wall 20. The arrangement is such that the shutter 24 will normally hang substantialy vertically from its hinge and thus be in a non-obscuring position due to the illustrated appreciable inclination of the side wall 20. A similar shutter 26 is attached in like manner by a hinge 27 to the other side wall 21, and electric solenoid actuators 28 and 29 are respectively operatively connected to the shutters 24 and 26 for control of the closing thereof in a manner to be described. The size of this lower burner box section 16 is such that there is only a relatively narrow boundary surface 30 at the bottom plane of the cavity, and a bottom plate 31 is suitably mounted in such plane to substantially cover the box section, with sufficient openings, such as indicated at 32, provided however for upward flow of air from the box section into the cavity.

The top of the oven is formed in a somewhat corresponding manner to provide an upper inverted burner box section 33 projecting above the top plane of the cavity. Such upper burner box section is dimensioned approximately the same as the lower section 16, but all of the top and side walls of the former are imperforate.

The oven is provided with a vent conduit which extends upwardly to the rear in a first section 34 from an opening 35 at the top rear of the liner 13 to a point beneath the backsplasher assembly 12 and then upwardly and forwardly in a continuation section 36 through this assembly to a discharge opening 37 in the front wall thereof. Such vent is provided with a branch conduit 38 attached at an opening in the wall of the first section 34 near the rear upper end of the latter and extending angularly forward to a secondary discharge opening 39 at the rear edge of the cooking top 11. This vent branch 38 houses an electrically heated catalytic oxidizing unit 40 of suitable form for a purpose to be set forth below, and the passage 38 is normally closed at the intersection with the first section 34 by a hinged damper 41. The damper 41 is shown in full lines in its such normally blocking position, and a solenoid actuator 42 is connected to the damper to move the latter when energized from such closed position to the open position shown in dashed lines wherein the main section 34 can communicate only with the branch vent 38, the passage to the continuation section 36 being closed by the damper in this position.

The lower burner box section 16 houses both a gas bake burner 43 and a first shielded electric resistance heating element 44, while a broiler burner 45 and a second such electric heating element 46 are housed within the upper burner box section 33. It will be noted that the first electric element 44 is below the bottom or bake burner 43 and the second element 46 is above the top or broiler burner 45, with the latter having a bottom attached heat distributing baffle 47 with sections inclining downwardly from the respective sides thereof. These components are all conventional per se, and it will be appreciated that the secondary air required for the gas burner operation in the oven can enter the cavity only at the lower box section openings 22 and 23, these being sized to admit sufficient ambient air to maintain the combustion at both burners.

As shown in the control diagram of FIG. 3, each burner is provided with a pilot burner 48 and associated electric igniter 49, the ignition of the latter and the flow of the gaseous fuel mixture to the pilot and main burners being regulated by a main oven temperature controller T of known design and operation. It is important that a suitable electric ignition system be employed, so that the gas supply to the oven can be fully shut off, and a valve V is shown in the gas supply line 50 for such shut-off under the control of a solenoid 51. The auxiliary electric heating elements 44 and 46, the vent damper solenoid actuator 42, the shutter solenoids 28 and 29, the solenoid 51 for the gas shut-off valve, and the vent oxidizing unit 40 are all connected in an electrical control circuit adapted to be energized from an available source. These components will be seen to be in parallel relation and connected to the supply terminals 52 through a common switch 53. In this simplified form, it will be readily apparent that when the switch 53 is closed, the gas supply will be fully interrupted to terminate any burner operation then in progress and preclude any further such operation for the period of time the switch remains closed. At the same time, the solenoids 28 and 29 move the shutters 24 and 26, respectively, against the lower side walls to close the secondary air inlets 22, 23. The vent passage is also altered by the shifting of the damper 41 by the solenoid 42, whereby all vapors and the like exhausted from the oven in this condition must pass through the catalytic oxidizing unit 40 before discharge to the atmosphere. The heating of the cavity in this cycle is of course provided or continued by the energization of the auxiliary electric heating elements.

As noted at the outset, this oven is intended to be used normally for cooking purposes as a gas oven, and it is not practical to attempt a self-cleaning cycle as discussed solely with burner generated heat. The auxiliary electric heating system arranged and controlled in the manner disclosed can be used for the desired automatic oven cleaning by pyrolysis independently of the burner system, but it is preferred that both heat sources be utilized for such cleaning by placing the switch 53 under control of the controller T as shown by the dashed line 54. According to the preferred self-cleaning cycle, the gas burners 43, 45 are caused to operate in the usual manner to heat the oven cavity to a temperature within the range of from about 400° F. to about 500° F. and, when this preselected temperature is reached, the controller T operates to close the switch 53, whereby the gas operation terminates and the electric elements continue heating of the oven to the desired temperature within the heat-cleaning range of from about 750° F. to about 950° F., the controller maintaining such temperature for the preselected period of time, for example, about two hours needed to effect the essentially pyrolytic cleaning. This cycle can be carried out in the new oven with electric energy at 110 volts providing the needed degree of supplemental heating produced by the electric system.

It will of course be appreciated that the housewife will both manually initiate the cleaning cycle by adjusting the controller setting to condition it for the noted control of the electric system and terminate the cycle after expiration of the recommended time by turning the controller to the "off" position. The oven will of course ordinarily be further equipped with a conventional timer, not shown, for usual time baking operations.

Other modes of applying the principle of the invention may be employed, change being made as regards the details described, provided the features stated in any of the following claims or the equivalent of such be employed.

We, therefore, particularly point out and distinctly claim as our invention:

1. A self-cleaning cooking oven comprising walls forming a cavity having an access opening, a door for closure of said access opening, gas burner means within the cavity for performing food cooking operations therein at temperatures not appreciably in excess of about 500° F., a wall section of the cavity being provided with a secondary air inlet for flow of ambient air into the cavity with the door closed during such gas cooking operations, electric heating means also within the cavity for heating the walls thereof to a self-cleaning temperature within the range of from about 750° F. to about 950° F., and shutter means for closing said secondary air inlet during energization of said electric heating means.

2. An oven as set forth in claim 1, including burner control means for precluding flow of gaseous fuel to the burner means during periods of energization of the electric heating means.

3. An oven as set forth in claim 1, including controlled actuator means for automatically closing said shutter means in response to energization of said electric heating means.

4. An oven as set forth in claim 1, including first vent means for substantially unimpeded exhaust of vapors and the like from the cavity to the atmosphere, second vent means having oxidizing means therein, and means for selectively directing gases proceeding from the cavity to said first or second vent means, with the oxidizing means thus provided for treating the gaseous degradation products resulting in the cleaning operation before discharge to the atmosphere.

5. An oven as set forth in claim 4, including controlled means for automatically directing the gases proceeding from the cavity to the second vent means during energization of the electric heating means.

6. An oven as set forth in claim 1, wherein the gas burner means comprises a bake burner in the lower portion of the cavity and a broiler burner assembly in the upper portion thereof.

7. An oven as set forth in claim 6, wherein the electric heating means comprises two resistance elements respectively in the lower and upper portions of the cavity.

8. An oven as set forth in claim 1, including temperature control means for energizing said electric heating means in response to the attainment of a preselected temperature in the cavity as a result of heating by said gas burner means.

9. An oven as set forth in claim 1, including an electrically operated shut off valve in the gas supply line of said burner means, electric actuator means for operating said shutter means, and control circuit means for energizing said valve and actuator means to close the gas supply line and the shutter means upon energization of said electric heating means.

10. An oven as set forth in claim 9, including vent means for the cavity having a first section leading substantially directly to the atmosphere and a second section in which there is catalytic oxidizing means, selector means for directing gases from the cavity to one or the other of said first and second sections, and means for automatically operating the selector means to direct the gases to the second section in response to energization of said electric heating means.

11. An oven as set forth in claim 10, wherein said gas burner means comprises a bake burner in the lower portion of the cavity and a broiler burner assembly in the upper portion thereof.

12. An oven as set forth in claim 11, wherein the electric heating means comprises two resistance elements respectively in the lower and upper portions of the cavity.

13. The method of cleaning the interior surfaces of a gas oven cavity on which food soils have accumulated as a result of gas burner food cooking operations therein, which comprises the steps of heating the cavity to a temperature of about 500° F. by operation of the gas burner means thereof, while admitting secondary air to the cavity sufficient to maintain combustion at the gas burner means, terminating the operation of the burner means and the further admittance of such secondary air upon the attainment of said temperature, supplying electrically generated heat to the cavity to continue the heating thereof to a self-cleaning temperature within the range of from about 750° F. to about 950° F. for a period of time sufficient to effect degradation of said food soils, exhausting gaseous products of such degradation from the cavity, and catalytically oxidizing said products before discharge to the atmosphere.

References Cited
UNITED STATES PATENTS

| | | | |
|---|---|---|---|
| 2,893,639 | 7/1959 | Martin | 219—279 X |
| 3,121,158 | 2/1964 | Hurko | 219—397 |
| 3,237,608 | 3/1966 | Brandl | 122—33 |
| 3,301,999 | 1/1967 | Chisholm | 219—393 |

BERNARD A. GILHEANY, *Primary Examiner*

VOLODYMYER Y. MAYEWSKY, *Assistant Examiner.*

U.S. Cl. X.R.

219—396, 393, 412; 126—21; 134—2, 20